United States Patent
Trabesinger et al.

(10) Patent No.: US 6,875,470 B2
(45) Date of Patent: Apr. 5, 2005

(54) UNDERCOATING FOR CONCRETE

(75) Inventors: Gerald Trabesinger, Kaltbrunn (CH); Peter W. Merz, Wollerau (CH)

(73) Assignee: Sika Schweiz AG, Zurich (CH)

( * ) Notice: Subject to any disclaimer, the term of this patent is extended or adjusted under 35 U.S.C. 154(b) by 0 days.

(21) Appl. No.: 10/451,062

(22) PCT Filed: Nov. 28, 2001

(86) PCT No.: PCT/IB01/02247
§ 371 (c)(1), (2), (4) Date: Jun. 20, 2003

(87) PCT Pub. No.: WO02/051953
PCT Pub. Date: Jul. 4, 2002

(65) Prior Publication Data
US 2004/0033315 A1 Feb. 19, 2004

(30) Foreign Application Priority Data
Dec. 23, 2000 (EP) .......................................... 00128475

(51) Int. Cl.$^7$ ................................................ B05D 3/02
(52) U.S. Cl. ...................... 427/386; 427/387; 427/393.6
(58) Field of Search ................................ 427/386, 387, 427/393.6

(56) References Cited

U.S. PATENT DOCUMENTS 4,101,497 A * 7/1978 Charves et al. .............. 523/454
5,554,672 A * 9/1996 Saito et al. .................. 523/466

FOREIGN PATENT DOCUMENTS

| DE | 10026148 | * 12/2000 |
| EP | 564760 | * 10/1993 |
| EP | 1048682 | * 11/2000 |
| JP | 63-273625 | * 11/1988 |
| JP | 63-273629 | * 11/1988 |
| JP | 05-295329 | * 11/1993 |

* cited by examiner

Primary Examiner—Erma Cameron
(74) Attorney, Agent, or Firm—Oliff & Berridge, PLC

(57) ABSTRACT

Novel undercoats for use on porous bases such as, for example, concrete are disclosed. Said undercoats contain or comprise at least one epoxy resin, at least one latent hardener and at least one solvent. The above are characterize in being easy to produce, contain no isocyanate groups and form a good ageing-resistant adhesion, in particular, with single component isocyanate-free sealants, cross-linked by means of silane groups.

19 Claims, No Drawings

UNDERCOATING FOR CONCRETE

REFERENCE TO RELATED APPLICATIONS

The present application claims the priority of European patent application No. 00 128 475.1, filed on Dec. 23, 2000, the disclosure whereof is here included by reference.

TECHNICAL FIELD

The present invention concerns novel undercoats for improvement of the adhesion of substrates, in particular of porous bases, such as for example concrete, with one- or two-component adhesive systems.

STATE OF THE TECHNOLOGY

Undercoats, also described as primers, activators or bonding agents, are used everywhere where the adhesive used achieves only a limited or no adhesion to the substrate or base. In this, the components of the adhesive system, namely the pretreatment, i.e. the undercoat, and the adhesive are matched to one another and to the substrate. Such undercoats can be physically setting or chemically crosslinkable. Pretreatment systems for different substrates are known, however there are no undercoats for porous bases on the market which are single-component, free from isocyanates, free from aromatic solvents and applicable with simple aids, e.g. brushes, and in combination with moisture-reactive adhesives or sealants, especially with isocyanate-free sealants based on silane-group terminated prepolymers, known as polyurethane hybrid or MS-Kaneka systems, display good, ageing-resistant adhesion.

In EP 0 921 140 A1 and U.S. Pat. No. 6,080,817, undercoats with isocyanate group-containing binders are described, these undercoats being used for the application of paint in automobile manufacture.

Already known from DE 100 26 148 are undercoats which contain an epoxy resin, a latent hardener, a solvent, and vinyltrimethylsiloxane.

The purpose of the present invention is to provide new undercoats for improving the adhesion of substrates, in particular of porous substrates, such as for example concrete, which are preferably isocyanate-free.

DESCRIPTION OF THE INVENTION

Surprisingly, it has now been found that an undercoat containing or consisting of at least one epoxy resin, at least one latent hardener, at least one bonding agent additive, which contains at least 2 functional groups, where at least one thereof is an epoxy group which can react with the latent hardener, and at least one thereof is a silane group or titanate group, and at least one solvent displays the desired good affinity to porous bases, such as for example concrete (DIN standardized or sandblasted), absorbent clinker, ceramics, garden paving stones, facing brick and various wood species (beech, pine, teak, etc.), and also to non-porous bases such as glazed clinker, and thus renders good adhesion of the coating material possible. Preferred coating materials are in particular single-component silane-based sealants. Moreover, the undercoats according to the invention are very simple to produce.

Means of Implementing the Invention

Substances preferably used in the undercoats according to the invention comprising at least one epoxy resin, at least one latent hardener, at least one bonding agent additive and at least one solvent are described in more detail below.

Possible epoxy resins are aliphatic and aromatic epoxy group-bearing compounds, especially those which are solid at room temperature. Preferred epoxy resins are: solid, bisphenol A-based resins of medium molecular weight.

Latent hardeners can be selected from the substance groups ketimines, aldimines or oxazolidines, cyclic, aliphatic ketimines being preferred. Preferred latent hardeners are: blocked, cycloaliphatic diamines and/or urethane bisoxazolidines.

For ecological reasons, possible solvents are preferably aliphatic solvents, such as for example ethyl acetate, butyl acetate, and other acetate-based solvents, acetone, methyl ethyl ketone, hexane, heptane, ethyl alcohol, cyclohexane, etc. Particularly for application on porous bases, the solvent content in the undercoat according to the invention lies in the range from 20 to 80 wt. %, preferably in the range from 50 to 60 wt. %, and the viscosity should lie between 20 and 200 mPas, particularly between 40 and 80 mPas. With too low a viscosity, the covering of a porous base, such as for example concrete, is insufficient, which results in reduced adhesion quality. With too high a viscosity, the pores of porous bases are inadequately filled, which owing to reduced mechanical anchoring of the undercoat to the base leads to a loss in adhesion. In addition, the workability of the primer is impaired. The optimal layer thickness in the dry state lies between 10 $\mu$m and 200 $\mu$m, particularly between 40 $\mu$m and 90 $\mu$m. By addition of small proportions of thixotropizing fillers, a thickness of about 65 $\mu$m is attained with one brushstroke, without thixotropization a layer thickness is of usually ca. 48 $\mu$m.

Depending on the application and the requirements profile, additives such as drying agents, catalysts, pigments, fungicides, stabilizers, fillers, such as for example uncoated or coated silicon dioxide, etc., can be added.

Bonding agents according to the invention contain titanates or silane groups, and the bonding agent contains at least one epoxy group as second functional group. By means of this second functional group, the bonding agent is incorporated into the matrix during or after the hardening reaction under the influence of the amine compound of the latent hardener, which is liberated by moisture. Preferably the bonding agent additive is hydrophobic.

The bonding agent serves firstly to improve the quality of adhesion to the base by means of chemical and physical properties, and secondly to provide attachment groups to the coating material, which are preferably single-component and isocyanate-free sealants.

The undercoat according to the invention can be used for the production of a coating in such a way that it is applied in a suitable layer thickness and, if necessary after a hardening period of preferably 30 to 120 minutes, is overlaid with a single-component isocyanate-free silane-based adhesive.

Below, some examples will be demonstrated, which further illustrate the invention, but are in no way intended to limit the scope of the invention. The undercoats according to the invention are simple to produce, stable on storage, and have good adhesion properties even after stressing, in particular after 1 week's storage in a saturated calcium hydroxide solution, and comply with the standards DIN 18540F and ISO 11600 25LM.

1) Production of the Coatings According to the Invention
Ex. 1 and Ex. 2

| Item | Chemical name | Function | Supplier | Ex. 1 Amount [wt. %] | Ex. 2 Amount [wt. %] |
|---|---|---|---|---|---|
| 1 | ethyl acetate | solvent | Impag AG Zürich | 39.7 | 39.2 |
| 2 | solid bisphenol A-based epoxy resin, medium molecular weight, EP No.: 1.9–2.0 Eq/kg | film-forming agent | | 38.7 | 38.2 |
| 3 | Aerosil 200 | thixotropizing agent | Degussa-Hüls, Zürich | 0.0 | 1.2 |
| 4 | orthoformate | drying agent | | 2.0 | 2.0 |
| 5 | epoxysilane (Silquest A-187) | bonding agent | Degussa-Hüls, Zürich | 10.3 | 10.2 |
| 6 | 1,3,3-trimethyl-N-(2-methyl propylidene)-5-[(2-methyl-propylidene)-amino]cyclohexane-methylamine | latent hardener | | 9.3 | 9.2 |
| | Total | | | 100.0 | 100.0 |

All step were carried out under nitrogen. The epoxy resin (item 2) was divided into three portions of equal size. Each individual portion was completely dissolved before the next portion was added. Items 4, 5 and 6 were each added one after the other with constant stirring. The thixotropizing agent Aerosil 200 was dispersed into the epoxy resin solution by intensive stirring.

2) Test Results with the Undercoat According to the Invention in Combination with PUR Hybrid Adhesive, Sikaflex-20AT

| Substrate | Reference | Example 1 | Example 2 |
|---|---|---|---|
| Concrete, sandblasted | 2/5 | 1/2 | 1/1 |
| Garden paving slab | 1/5 | 1/1 | 1/1 |
| Concrete, DIN standardized | 1/5 | 1/1 | 1/1 |
| Tiles | 1/4 | 1/2 | 1/1 |
| Clinker, porous | 1/3 | 1/1 | 1/1 |
| Clinker, glazed | 1/5 | 1/1 | 1/1 |
| Ceramic, porous | 1/4 | 1/2 | 1/1 |
| Beech | 1/4 | 1/2 | 1/2 |

Key:
1 = >95% cohesive failure, OK
2 = 75% –95% cohesive failure, OK
3 = 25% –75% cohesive failure, not OK
4 = <25% cohesive failure, not OK
5 = 0% cohesive failure, not OK The first number gives the assessment of the adhesion after 2 weeks storage in an air-conditioned room (23° C., 50% rel. atmospheric humidity).

The second number gives the adhesion after 2 weeks air-conditioned storage and 1 week storage in water at room temperature.

Examples 1 and 2 show that the undercoat according to the invention after the storage in water ensures very good adhesion compared to the reference.

While preferred embodiments of the invention are described here at present, it must clearly be understood that the invention is not limited to these, but in the context of the following claims can be implemented in many other ways.

We claim:

1. An undercoat, wherein the undercoat comprises at least one epoxy resin, at least one latent hardener, at least one solvent and at least one bonding agent additive, wherein the bonding agent additive contains at least 2 functional groups, whereof at least one is an epoxy group which can react with the latent hardener, and at least one a silane group or titanate group.

2. The undercoat as claimed in claim 1, wherein the undercoat has a viscosity between 20 and 200 mPas.

3. The undercoat as claimed in claim 1, wherein the bonding agent additive is a hydrophobic bonding agent additive.

4. The undercoat as claimed in claim 1, wherein the solvent is free from aromatics.

5. The undercoat as claimed in claim 1, wherein the latent hardener is an oxazolidine and/or a ketimine and/or an aldimine.

6. The undercoat as claimed in claim 1, wherein the latent hardener in addition to the groups causing the hardening also additionally contains a silane group.

7. The undercoat as claimed in claim 1, wherein the epoxy resin is solid.

8. The undercoat as claimed in claim 1, wherein the undercoat is isocyanate-free.

9. A process for application of an undercoat onto a base, wherein the undercoat as claimed in claim 1 is applied in a layer thickness after drying of 10 μm to 200 μm.

10. The process as claimed in claim 9, wherein the base is a porous base.

11. A process for the production of a coating, wherein an undercoat applied by the process as claimed in claim 9, hardening period of 30 to 120 minutes, is overlaid with a single-component, isocyanate-free, silane-based adhesive.

12. A process for improving the adhesion of a single-component, isocyanate-free, silane-based adhesive to a porous base, comprising applying the undercoat as claimed in claim 1 to the porous base, followed by application of the single-component, isocyanate-free, silane-based adhesive.

13. A process for improving adhesion of an undercoat, comprised of at least one epoxy resin, at least one hardener and at least one solvent, to a base, comprising including in the undercoat a bonding agent additive which contains at least 2 functional groups, whereof at least one is an epoxy group which can react with the latent hardener, and at least one a silane group or titanate group.

14. The undercoat as claimed in claim 1, wherein the undercoat has a viscosity between 40 and 80 mPas.

15. The process for application of an undercoat onto a base as claimed in claim 9, wherein the undercoat is applied in a layer thickness after drying of 40 μm to 90 μm.

16. The process as claimed in claim 10, wherein the base is concrete.

17. The process as claimed in claim 15, wherein the base is a porous base.

18. The process as claimed in claim 17, wherein the base is concrete.

19. A structure comprising concrete, the undercoat as claimed in claim 1, and a single component, isocyanate-free, silane-based adhesive thereon.

* * * * *